United States Patent [19]

Anderson et al.

[11] Patent Number: 4,958,273
[45] Date of Patent: Sep. 18, 1990

[54] MULTIPROCESSOR SYSTEM ARCHITECTURE WITH HIGH AVAILABILITY

[75] Inventors: Patrick E. Anderson, San Jose, Calif.; Roland J. Bunten, Tucson, Ariz.; William T. Higgins, San Jose, Calif.; Ronda J. Hruby, San Jose, Calif.; Serge Mirabeau, San Jose, Calif.

[73] Assignee: International Business Machines Corporation, Armonk, N.Y.

[21] Appl. No.: 89,372

[22] Filed: Aug. 26, 1987

[51] Int. Cl.$^5$ .................... G06F 15/16; G06F 13/14; G06F 11/00
[52] U.S. Cl. .................. 364/200; 364/270.7; 364/228.3; 364/229; 364/229.4; 364/268.5; 364/280; 364/282; 364/282.4; 364/242.6; 371/8.1; 371/11.3
[58] Field of Search ... 364/200 MS File, 900 MS File, 364/200, 900; 371/8, 10, 11

[56] References Cited

U.S. PATENT DOCUMENTS

| | | | |
|---|---|---|---|
| 3,889,237 | 6/1975 | Alferness et al. | 364/200 |
| 4,056,844 | 11/1977 | Izumi | 364/900 X |
| 4,084,231 | 4/1978 | Capozzi et al. | 364/200 |
| 4,207,609 | 6/1980 | Luiz et al. | 364/200 |
| 4,228,496 | 10/1980 | Katzman et al. | 364/200 |
| 4,396,984 | 8/1983 | Videki, II | 364/200 |
| 4,399,504 | 8/1983 | Obermarck et al. | 364/200 |
| 4,594,657 | 6/1986 | Byrns | 364/900 X |
| 4,805,106 | 2/1989 | Pfeifer | 364/200 |
| 4,823,256 | 4/1989 | Bishop et al. | 364/200 |

Primary Examiner—Gareth D. Shaw
Assistant Examiner—Paul Kulik
Attorney, Agent, or Firm—Simon K. Lee; Henry E. Otto, Jr.

[57] ABSTRACT

High availability is achieved in a multiprocessor system by grouping the processors into two clusters operating on different clock and power boundaries. In each cluster is an array containing a substantially identical copy of the system information relating to the operation of the processors. Each processor has a local port for accessing the local array and a remote port for accessing the remote array. When an update is made on the system information, it is made on both the local and remote arrays with the remote update performed transparently.

10 Claims, 10 Drawing Sheets

L P = LOCAL PORT    R P = REMOTE PORT    GI = GLOBAL INTERRUPT LATCH

MULTIPROCESSOR SYSTEM ARCHITECTURE WITH HIGH AVAILABILITY

TECHNICAL FIELD

This invention relates to the architecture and the operation of a multiprocessor computer system. More particularly, it relates to a configuration of a multiprocessor system, as well as method and apparatus for maintaining system information therein so as to improve system availability and maintain system performance in event of a hardware failure.

BACKGROUND OF THE INVENTION

In the design of a computer system, it is important to provide a degree of system availability that is necessitated by the applications for which the system is intended. System availability ranges from the minimization of a system's down-time in event of a failure, to the ability of a system to remain functional in spite of occurrences of failures in portion thereof.

One common method of attaining high system availability is to have a multiprocessor system wherein the workload of a failed processor can be transferred to a backup processor. One of the major concerns in this method, however, is to minimize the tradeoff cost, which, besides the cost of extra hardware, often includes a performance degradation due to additional processing cycles spent on implementing the processing backup.

In an in-flight control system of spacecrafts, for example, the application requires that failures in any one portion of the system must not cause any interruption or delay of its functioning. Such availability is achieved by having N identical processing units executing in a redundant manner, so that operation of the system can continue even with the presence of failures in one or more units. While achieving high availability, the redundancy required thereby is usually too costly for most commercial applications.

The Tandem computer architecture, as disclosed in U.S. Pat. No. 4,228,496, represents an alternate approach in system redundancy and availability. During normal operation, each processor in the Tandem multiprocessor system would process different transactions. When one processor fails, its workload is transferred to a backup processor. To enable backup processing, each processor periodically communicates checkpoint information to the other processors. When a backup processor takes over, it reconstructs the interrupted processes from checkpoints before continuing their processing. The need to reconstruct processes from checkpoints, however, means that some real time delays must be experienced by the interrupted transactions.

An object of this invention is to provide a fault-tolerant multiprocessor system in which each processor operates independently during normal operation, but in which processing of a failed processor can be continued by backup processors. Furthermore, it is a related object of this invention to ensure that backup processing can be continued immediately, without the need of transaction reconstructions and without performance degradation.

In order to facilitate backup processing, system control information must be communicated between processors. Therefore, a further related object of this invention is to provide a method and apparatus for communicating information between multiple processors.

A prior art method for communicating common system information is described by Luiz et al in U.S. Pat. No. 4,207,609, and assigned to the assignee of the present invention. Therein, common system information required by a storage path (i.e. the map of network topology and necessary context information) is stored in a common control node (the dynamic pathing memory, DPM) in the network. Access to the common information involves communication between a processor and the DPM. Moreover, if access to the DPM becomes unavailable because of failures occurring in the DPM, the storage path would become disconnected. In other methods for communicating common information between processors, the communication is not performed transparently to the operation of processors, resulting in system performance degradation Therefore, a related object of this invention is to enable the transparent communication of common system information, as well as to ensure that system availability would not be degraded because of inaccessibility of this system information.

SUMMARY OF THE INVENTION

The multiprocessor system of the present invention is of the kind in which each processor operates independently on different processes. Each processor asynchronously accesses common system information which is updateable dynamically and concurrently by more than one processor. The system comprises: two clusters of processors, each cluster operating on a separate clock and power boundary; array means in each cluster having definable, lockable regions therein for storing the system information, each array having a plurality of local ports and remote ports; each local port having register means for storing address, data, control and status information and coupled to a corresponding remote port in the other cluster for communication therewith; each remote port having register means corresponding to the register means of a local port for concurrently storing the same information, and coupled to a corresponding local port of the other cluster for communication therewith; and an arbiter mean coupled to each said array means and communicating with the arbiter in the other cluster for arbitrating local and global accesses to both the local and the remote arrays and the operation thereto.

DESCRIPTION OF THE PREFERRED EMBODIMENT

In the above identified Luiz et al patent, there is described a method and apparatus for control unit path finding in a multi-CPU system environment wherein the CPU's are connectable to devices via channels and control units. Therein, each CPU in the system is allowed to reserve a device over one channel and be capable of subsequently starting an I/O operation to the same device over a second channel. If the first channel were busy, the operation could still be initiated immediately, rather than waiting for that channel to become available. Multi-way reservation and reconnection of devices by CPU's require access to control information, including a map of network topology and necessary context information utilized by the control unit in managing the connection between CPU's to devices.

Figure 1:
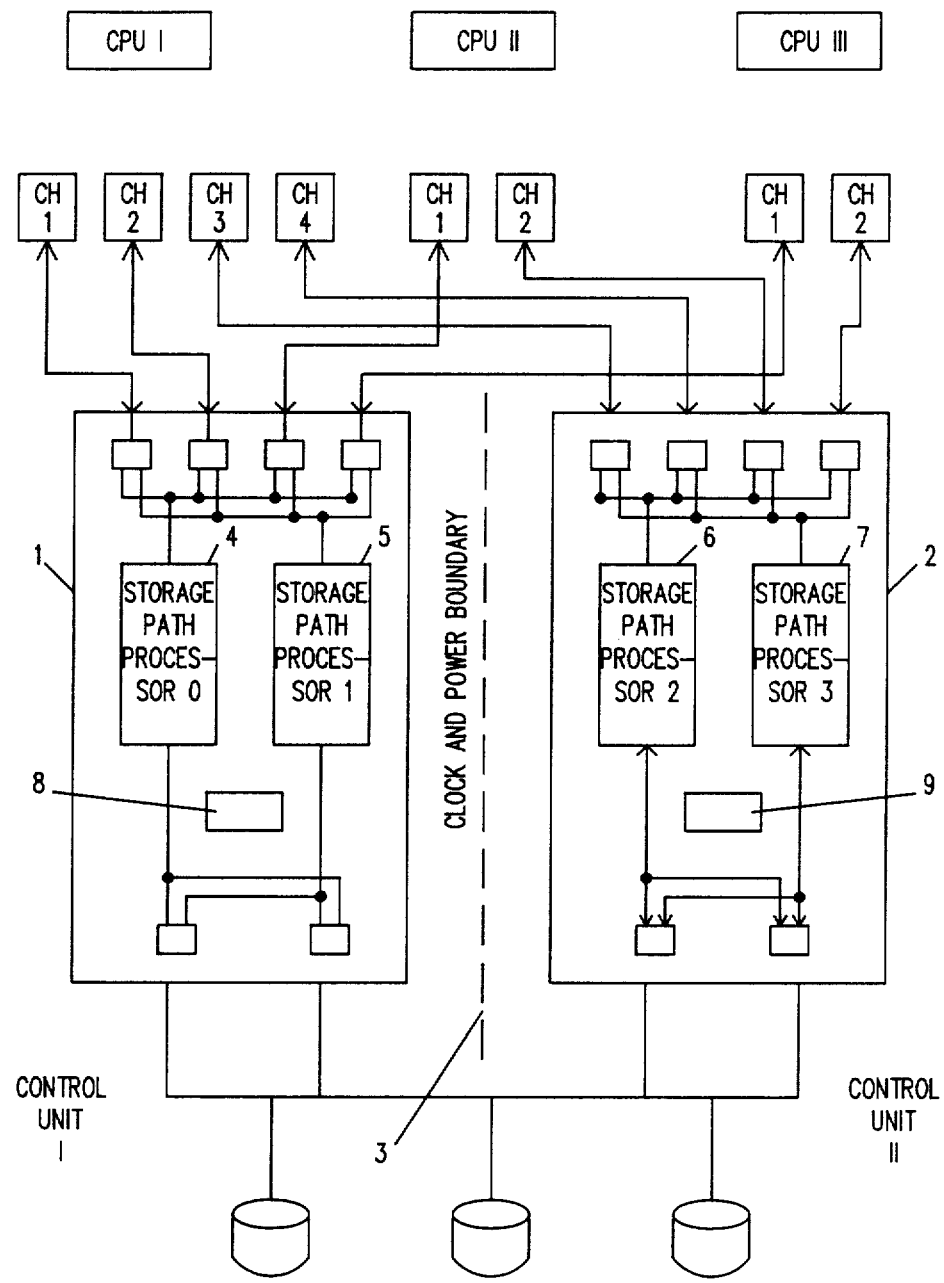
FIG. 1 illustrates a data storage subsystem embodying the present invention.

FIG. 1 shows a system embodying the present invention and which constitutes an improvement to the system described in the above identified Luiz et al patent. As shown in FIG. 1, storage paths between the channels and the storage device are provided by a control unit which comprises directors 1 and 2 operating on different clock and power boundaries 3. By operating the storage directors on different clock and power boundaries, the operability of one storage director unit is isolated from failures of the other storage director.

Each storage director has a plurality of processors 4, 5, 6, 7, each of which operates from an identical copy of a function code, as well as a copy of an initialization and error recovery code. These copies may reside in a separate memory as in this embodiment, or it may reside in the arrays 8, 9 which will be described hereinafter. Each processor is normally executing the function code to manage paths between CPU's and devices. Accordingly, a storage director is basically a cluster of processors each of which is executing independently. The terms cluster and control will hereafter be used interchangeably.

A copy of the above mentioned control information is stored in an array in each of the two control units. By duplicating the control information in each of the control units, the following two advantages are realized:
(a) Operation of the storage subsystem no longer depends on the availability of the common DPM.
(b) By storing a copy of the control information in each control unit, a processor can access the control information directly, without the need of request/response communications with the DPM during storage path operations.

Figure 2:
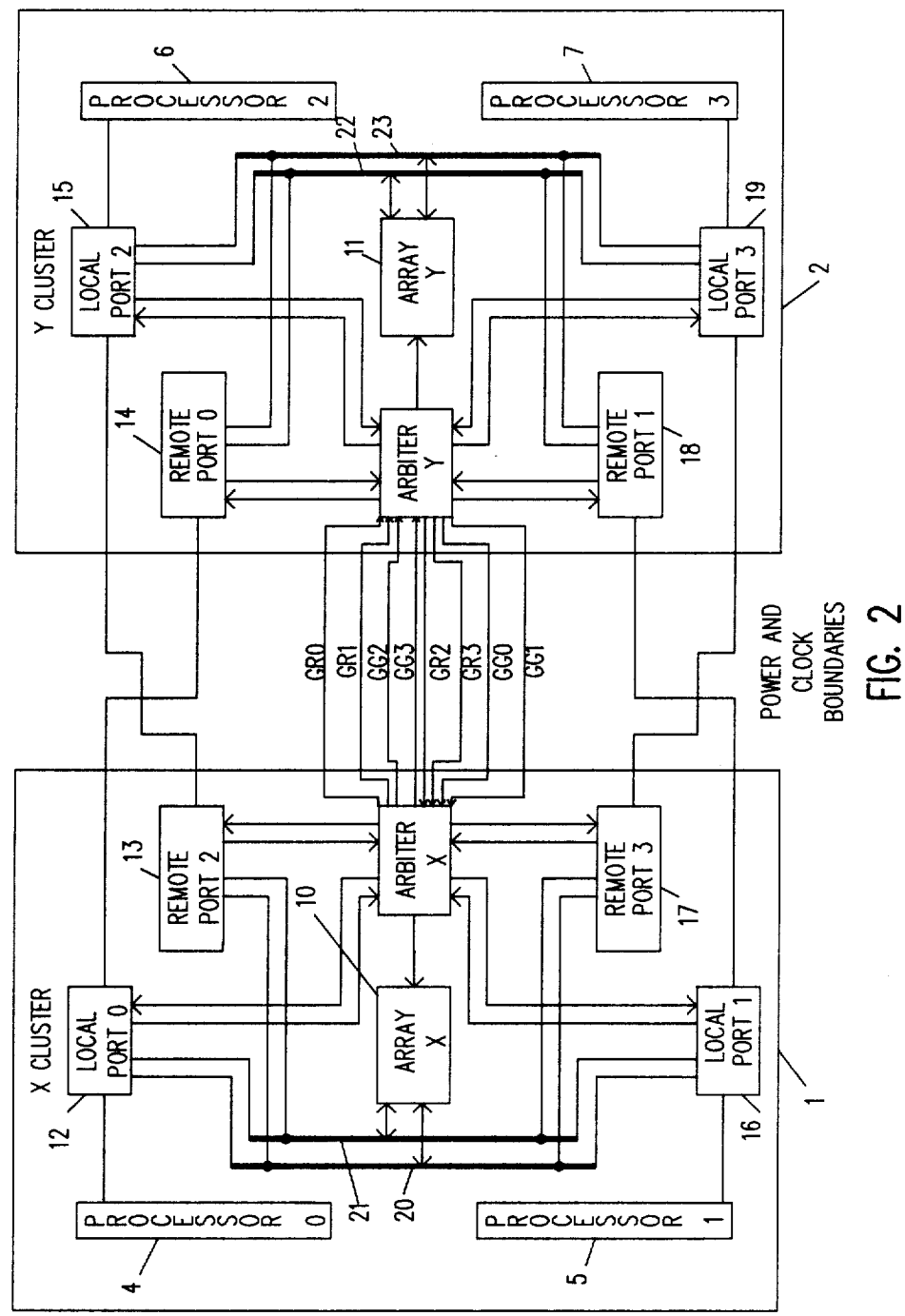
FIG. 2 is a block diagram showing interconnections between the arbiters, processors, arrays and access ports.

FIG. 2 is a lower level block diagram of the control units shown in FIG. 1. In FIG. 2 is shown an array 10, 11 in each control unit 1, 2 for providing storage of the control information. Each array is a random access memory (RAM) of 64K bytes with 9 bits (including a parity bit) per byte. Each array is partitioned into a plurality of control blocks each of which is protected by a lock byte. In this embodiment, the partitioning is performed by software although it is obvious to those skilled in the art that the partitioning may similarly by accomplished in hardware.

An array is accessible to processors within the array's cluster (the local processors) through a respective local port. The address 20, 22 and data 21, 23 lines of each array are shared between the ports to which the array is connected. A local port contains a set of registers, including address, data, control and status registers. A processor communicates with its corresponding local port by loading the registers through a register control interface.

Each local port communicates with a single remote port on the other cluster so as to provide the processor access to the array in the other cluster. Local ports also communicate with the arbiter of their local cluster.

A remote port is implemented as a subset of the logic of a corresponding local port. It contains address, data, control and status registers which shadow the corresponding registers in the local port. When a local register is loaded by a processor, its counterpart remote register is also loaded. Remote ports communicate with the array and the arbiter in their respective clusters.

Array operations are triggered when a processor writes to specific registers in its local port. Since a corresponding remote register is loaded concurrently with the loading of a local register, an array operation in the remote cluster is therefore also initiated by the initiation of a local array operation. When triggered, the local port will complete the array operation and post the resulting status of that operation to the processor.

Control of accesses to the array of a cluster is performed by that cluster's arbiter, X or Y. The arbiter ensures that only one port is on the array's busses during an array cycle. Array select and array read/write controls are also performed by the arbiter. Each arbiter controls the operations of its array independently of the arbiter in the other cluster, but communicates with the other arbiter to resolve arbitration for global operations which require serialization (see below).

Each arbiter X,Y communicates with the local/remote ports within its cluster through command busses over which the ports request read/write array cycles as well as reading of status bits or setting of control bits from an arbiter. In return, the arbiter provides control signals to the ports to control array cycles execution.

A function performed by a processor may comprise several array operations each of which is performed in one of the following modes of operation. The modes of operation implemented in this embodiment include:
(1) Dual mode - This is the normal operating mode of the storage subsystem in which both clusters are fully functional. In dual mode, the same data is written in tandem to both arrays at the same address. Local and remote ports also read data from the same location of their respective arrays. A remote port passes the read data to its corresponding local port where data from both arrays can be compared.
(2) Remote mode - This is a degraded mode of (in the sense of losing redundancy of arrays, but not performance) in which a processor accesses only the array in the remote cluster under the control of the remote arbiter. In this mode, data to be written or read from the remote array is carried over via a remote/local port interface to the local port, and then to the processor.
(3) Local mode - This is also a degraded mode of operation (in the sense of losing redundancy of arrays, but not performance) in which a processor accesses only the array in its local cluster via the local port under the control of the local arbiter. In this mode, the remote port shadows the local port except that no array accesses are requested.

For example, to copy the remote array into the local array, a processor performs a read remote operation to obtain the remote array information, and thereafter a write local operation to store the information into its local array without re-writing the mode register between operations.

Operating modes are initiated at power-on and changed when an array or path to the array becomes unavailable. Operating modes can be controlled by each processor in either cluster. In the event of hardware failures which make it impossible for a processor to access one array, the storage subsystem is reconfigured so that all the processors access only the other array. Reconfiguration is initiated by the processor experiencing the hardware failure. This processor interrupts the other processors by means of the global interrupt facility (GIF) which will be described hereinafter and communicates signals indicative of a mode switching. In degraded mode, the processors in one cluster would access the array in local mode, while the processors in the other cluster would access the array in remote mode.

Four basic kinds of array operations can be performed by a processor:

(a) READ - A processor initiates a READ operation by first loading the address register of its local port. When a dual mode READ operation is initiated, both the local and remote ports perform an array read sequence independently and in a substantially concurrent manner. The remote port returns the data fetched to the local port. In dual mode operation, the local port will then compare the data fetched locally with the data fetched from the remote port. The processor is then notified so it can read the data from the data register.

(b) WRITE - A processor initiates this operation by loading the desired address in the address register and writing the data register. Like a READ operation, both the local and remote ports normally perform the operation in a substantially concurrent manner. The remote port returns a status indicator to the local port concerning the success of the operation, the indicator is in turn made available to the processor.

(c) TEST AND SET (T&S) - This is an operation used by a processor to lock defined regions of the arrays to prevent access collisions. A processor initiates a TEST AND SET operation by first setting a bit in the control register of each port indicating that all array write operations are to be treated as TEST AND SET operations.

A TEST AND SET operation is executed by first reading a lock byte. If the lock byte is zero, then a SET cycle is requested to write a nonzero value into the lock byte of both arrays if the operation is executed in dual mode, or into the lock byte of the operational array if the operation is executed in single mode. If the lock byte is nonzero, that means another processor has the lock, and the set portion of the cycle is aborted. A processor must retry the test and set operation until successful before processing data on this region.

(d) UNCONDITIONAL SET - This operation is normally used to reset a lock byte to zero so that the corresponding region is unlocked. This operation is atomic with respect to TEST AND SET operations and other UNCONDITIONAL SET operations. The lock byte is reset without a prior testing of its value. Typically a processor uses a TEST AND SET operation to lock an array region, performs read and write operations as required, and then unlocks the region using an UNCONDITIONAL SET operation.

TEST AND SET and UNCONDITIONAL SET operations are serialized by the arbiters. Thus, all TEST AND SET operations are atomic relative to other TEST AND SET operations and UNCONDITIONAL SET operations.

To maintain the integrity of the arrays, the following two rules are implemented into the function code of each processor:

1. No read and write operations are to be performed on an array control block unless a successful TEST AND SET operation has been performed on the corresponding lock byte; and
2. Once all read and write operations on an array block are completed, the corresponding block is unlocked using an UNCONDITIONAL SET operation to allow other processors access to the block.

Read and write operations are performed independently on each array without arbiter-to-arbiter communication and can occur in the middle of TEST AND SET operations by other processors.

Both TEST AND SET and UNCONDITIONAL SET operations are controlled by logic in the arbiters which insure that they are executed serially in the one array case, and that they are executed serially and in the same sequence in the dual array case. Dual mode TEST AND SET and UNCONDITIONAL SET operations can be differentiated from their local or remote versions by the command type sent on the respective command bus.

During the execution of a TEST AND SET operation, several interim cycles exist between the TEST portion and the SET portion in which no other TEST AND SET or UNCONDITIONAL SET operations are allowed from other ports. This "dead" time is used by other ports to execute read and write operations.

By way of example, consider the event sequence listed in Table 1a. During interval 1, processor P1 makes a read request simultaneously with processor P3 making a write request. Since a successful TEST AND SET operation is required before read and write operations, it follows that the read and write operations requested must be ones which are to be performed on different array addresses. Thus, regardless of the order of execution of read and write operations in the clusters, the end result of the two operations will be the same. Therefore, read and write operations can be interleaved regardless of the operating mode. In the example shown in Table 1, P1's read operation executes before P3's write operation in the X cluster, but in the Y cluster the order of execution is reversed.

TEST AND SET operations are handled differently. Referring to Table 1b, in the single cluster case, during interval 1, processors P0 and P1 make TEST AND SET requests in local mode. In this case, P1's request cannot begin execution until P0's request has finished execution. TEST AND SET operations are executed serially in the single cluster case, and no communication occurs between the two arbiters.

Referring to Table 1c, during interval 1, P0 and P2 both initiate TEST AND SET requests in dual mode, and P3 simultaneously requests a read operation. The TEST AND SET operations are executed serially and in the same sequence for dual cluster TEST AND SET operations. In this mode, communication is necessary between the two arbiters to insure that the TEST AND SET operations are executed in the same order on both clusters. Also, the read operation by P3 is allowed to occur between the TEST and the SET portions of the T&S operation in the Y cluster.

Figure 3:
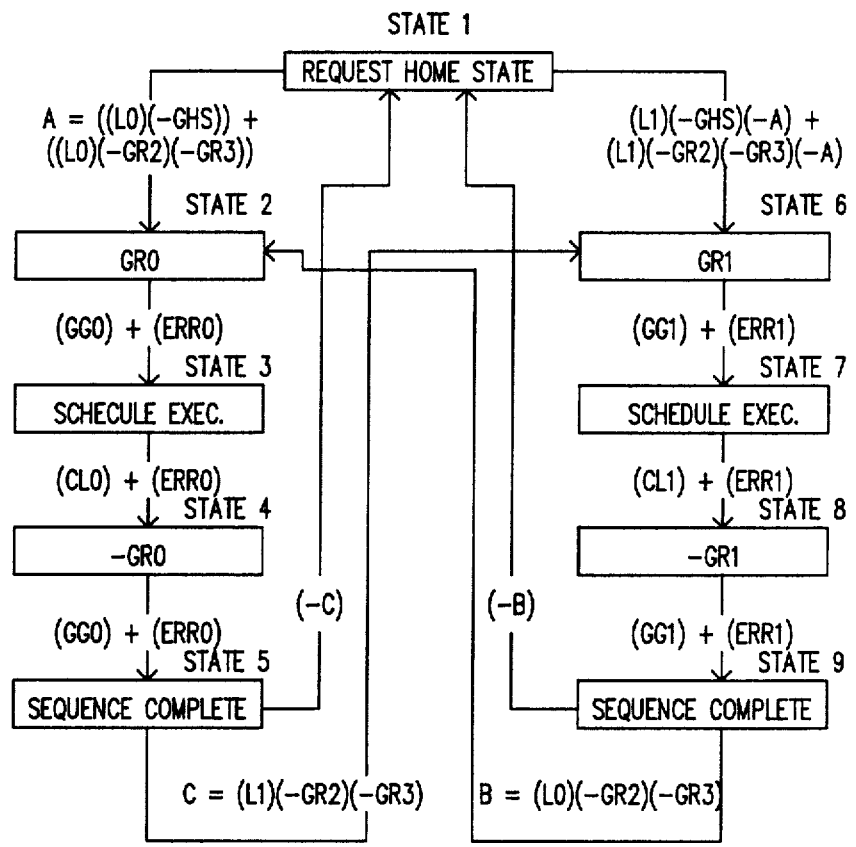
FIG. 3 shows the request state machine in the arbitration logic.
Figure 4:
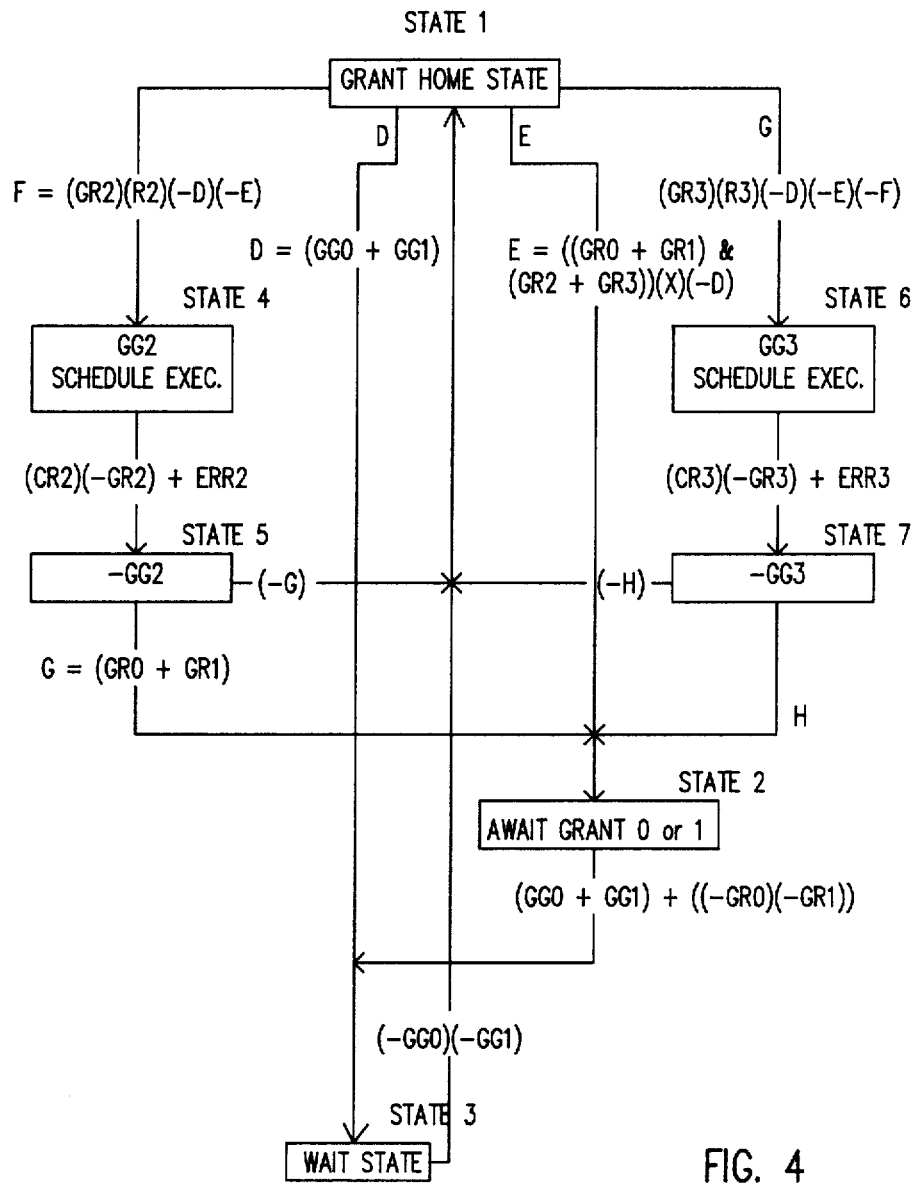
FIG. 4 shows the grant state machine in the arbitration logic.

FIG. 3 shows the request state machine of the arbitration logic for insuring that dual mode TEST AND SET operations are executed serially and in the same sequence in both clusters. (The definitions of the abbreviations used in FIGS. 3 and 4 are listed in Table 3) Whenever a dual mode TEST AND SET command is received by an arbiter (e.g. arbiter X) from a local port, that request is sent to the remote arbiter (arbiter Y) via the global request path X line from arbiter X to arbiter Y. The request state machine thereafter goes from state 1 (request home state) to either state 2 (global request from processor 0, GR0) or state 6 (global request from processor 1, GR1), depending on which processor is making the request. When arbiter Y responds by activating a corresponding global grant path X line (global grant to processor 0, GG0, or global grant to processor 1, GG1), the initial handshaking is complete and both clusters may execute the TEST AND SET or UNCONDITIONAL SET operations for the initiating processor.

FIG. 4 shows the grant state machine of the arbitration logic. Grant line activation and scheduling of command execution is shown by the grant state machine going from state 1 (grant home state) to either state 4 (global grant from processor 2, GG2) or state 6 (global grant from processor 3, GG3). The grant line activation causes the request state machine to go from either state 2 or state 6 to either state 3 or state 7. When the TEST AND SET operation is complete, arbiter X will drop its request path X line. This is shown by the request state machine going from either state 3 or state 7 to either state 4 (no global request from processor 0, —GG0) or state 8 (no global request from processor 1). Arbiter Y will then drop its global grant path X line to complete the handshake, and the grant state machine will go from either state 4 or state 6 to either state 5 (no global grantor from processor 2, —GG2) or state 7 (no global grant from processor 3 —GG3), and then returning to grant home state.

The deactivation of the global grant path X line causes the request state machine to go from either state 4 or state 8 to either state 5 or state 9, and then return to its request home state.

In order to break a tie in the event of simultaneous requests, a priority bit, called the cluster priority indicator (CP1), is provided in each cluster. During initialization, the bit in one cluster is set if that cluster is given a higher priority while the bit is reset in the other cluster. This bit forces the lower priority cluster to give a grant to the higher priority cluster in the case of simultaneous requests for dual mode TEST AND SET operations from both clusters. An arbitrary higher priority is also given to the even number processors on each cluster over the odd number processors.

Referring to FIG. 4, in a tie situation, the grant state machine of the cluster with the cluster priority indicator bit set will go from grant home state to state 2, while the other clusters arbiter will be forced to respond with a grant by going from grant home state to either state 4 or state 6.

Fairness to the lower priority cluster is maintained by inserting exit paths in the request state machine from state 5 and state 9. After a cluster has completed a lock command sequence originated by a processor resident on the cluster, if the other cluster has a request queued, the request state machine will return to home state before making another request, giving the grant state machine time to respond to the other cluster request. On the other hand, if the other cluster has no request queued, but the other processor on the cluster does have a request queued, the request state machine would immediately respond to the request from the other processor in the cluster, by going from state 9 to state 2, or from state 5 to state 6.

For the grant state machine, fairness is maintained by exit paths from state 5 and state 7. After a cluster has completed a TEST AND SET operation originated by a processor, the grant state machine will go from either state 5 or state 7 to state 2, awaiting a grant from the other cluster.

A set of rules are implemented in the arbiter for granting priority to requests. The following set is given as an example:

1. READ and WRITE operations, the test portion of eligible TEST AND SET operations, eligible UNCONDITIONAL SET operations, and arbiter commands are given the highest priority.

Local or remote mode TEST AND SET or UNCONDITIONAL SET operations from a processor are eligible for execution if no other processor has a TEST AND SET operation in progress.

Dual mode TEST AND SET or UNCONDITIONAL SET are global operations from a processor and are eligible if they have been approved for execution on a global basis by the arbitration logic shown in FIGS. 3 and 4, and no other processor has a TEST AND SET operation in progress.

2. The set portion of eligible TEST AND SET operations have the lowest priority.

3. All ties are resolved with the even number remote port having the highest priority, followed by the odd number remote port, followed by the even number local port, with the odd number local port having the lowest priority. Remote ports are given priority over local port since they are the longest execution path during dual read and compare operations.

By implementing the three rules with two eligibility rules under rule 1, a bilevel priority scheme is provided.

The following examples illustrate the application of the above port priority and eligibility rules:

1. Remote port 2 and local port 1 make simultaneous requests to read the array on the X cluster. Both ports have eligible commands for the next execution cycle (rule 2.) Remote port 2 has higher priority (rule 5) and will be granted the next array cycle.

2. Remote port 2 makes an array test request and local port 0 makes a simultaneous array read request. In the meantime, local port 1 has a TEST AND SET operation in progress, but is not currently making a request. The request from local port 0 is eligible, but the request from remote port 2 is not. Local port 0, being the only eligible port, is granted the next array cycle.

Failures and error conditions in the arbitration logic will result in an Arbitration Error being set for all processors with a dual TEST AND SET or UNCONDITIONAL SET operation in progress or queued. Recovery from this error consists of issuing an arbiter reset command to the arbiter and retrying the failed TEST AND SET or UNCONDITIONAL SET operation. The arbiter reset command causes the Grant and Request state machines to be reset to their respective home states. An arbiter reset command may result in an Arbitration Error being set for all processors having a dual mode TEST AND SET operation in progress or queued, since this command disrupts the sequential logic in handling the operations.

The initialization and error recovery by each processor is implemented by a microprogram executing within the processor. Since the processors are executing the same code, it is necessary to insure that an arbiter error does not cause two or more processors to conflict during error recovery. This is accomplished by the use of a queue flushed (QF) bit.

Figure 5:
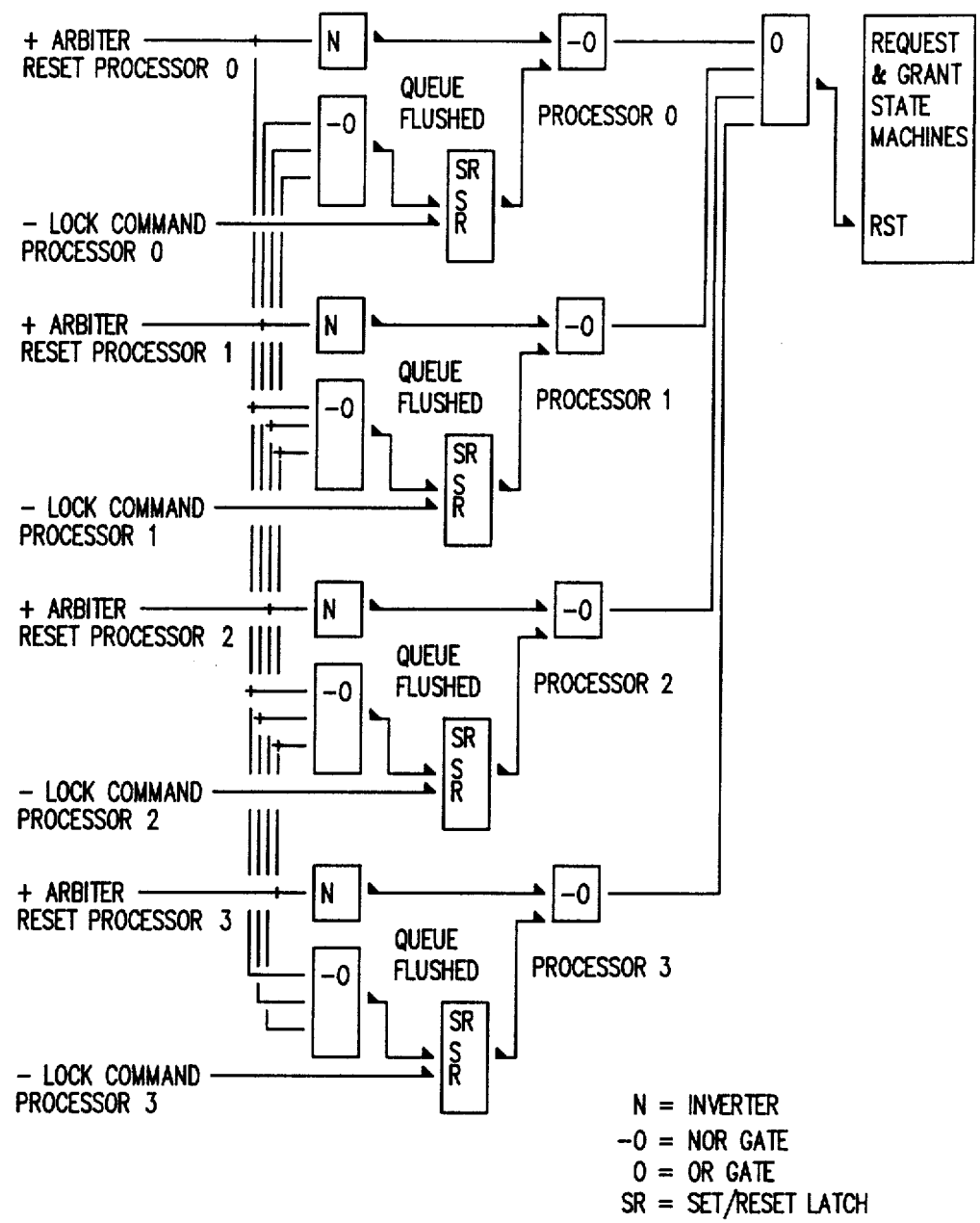
FIG. 5 shows the logic of the queue flushed (QF) bit.

The logic of the QF bit is shown in FIG. 5. The QF bit is set for a processor if another processor has executed an ARBITER RESET command. If this bit is set for a processor, then the execution of a ARBITER RESET command by that processor has no effect on the arbitration logic and is effectively executed as a no-op. This bit is reset when a dual TEST AND SET or dual UNCONDITIONAL SET command is executed by the corresponding processor.

By way of example, consider the event sequence shown in Table 2. During interval 1, processors P0 and P2 make simultaneous requests for a dual mode TEST AND SET operation. Let P0 win the resulting dual arbitration. During execution of P0's request, an arbiter error occurs. This causes the arbiter error bit to be set for all processors with a TEST AND SET operation in progress or queued (both P0 and P2). Both processors enter error recovery. P0 resets the arbiter at interval 7 and retries the operation at interval 9. This arbiter reset results in the QF bit being set for P1, P2 and P3. Because of timing differences, P2 does not perform its arbiter reset until interval 10. If the reset by P2 were allowed, another arbitration sequence check to P0 would result. However, since P2's QF bit is set, the arbiter reset command is effectively a no-op. P0 retries its TEST AND SET operation successfully as does P2. In addition, P2's TEST AND SET operation resets its QF bit, thus allowing it to reset the arbiter in case of future arbitration errors.

The arrays are normally accessed in dual mode. In the event of any failures occurring in the arrays or cluster, a processor can reconfigure the operating mode so as to operate on a single array.

To reconfigure the operating mode, a processor signals the other processors about the change. Normally, the processors communicate via the arrays. However, if one array becomes unavailable, a global interrupt facility (GIF) is then provided so that each processor can signal the other processors about the need for reconfiguration. The GIF may also be used at initialization to bring up the processors and the two arrays in an orderly fashion.

The GIF is implemented by modifying TEST AND SET and UNCONDITIONAL SET operations of a requesting processor such that a global interrupt latch is set in the corresponding ports of the other processors. When this latch is set, it causes array operations in the receiving processors to complete with an operation check. The operation check causes an interrupt to the receiving processors, notifying each of the pending change in mode of operation.

The bit in the control register in each port of the requesting processor modifies both the UNCONDITIONAL SET operation and the TEST AND SET operation as follows:

Upon completion of a successful TEST AND SET or UNCONDITIONAL SET operation, the arbiter would set the global interrupt latches in all the ports except the requesting port.

The latches would be set in both clusters during a dual operation, in the local cluster only during a local operation, and in the remote cluster only during a remote operation.

If the global interrupt latch is set in a port, it does not affect any array operation in progress, but will cause an operation check upon completion. It indicates that another processor is signaling for a mode change.

Each global interrupt latch must be reset by the receiving processor. A processor may set other processor's global interrupt latches, but may reset only its own latch.

The GIF is used in conjunction with the a mode control block in an array to implement mode changes. The mode control block also has a lock byte. A processor which wants to signal a mode change must own this lock by executing a successful TEST AND SET operation on the lock. Once the lock is owned, reconfiguration data is written in the control block. The lock is then released by an UNCONDITIONAL SET operation which also set the global interrupt latches in the other processors to indicate that a mode change is pending. Each interrupted processor then executes a TEST AND SET operation to own the mode control block and then releases the block. Once successful, a processor writes acknowledgement data in the mode control block. In this way, all the processors are directed to the new mode in the controlled fashion.

Figure 7A:
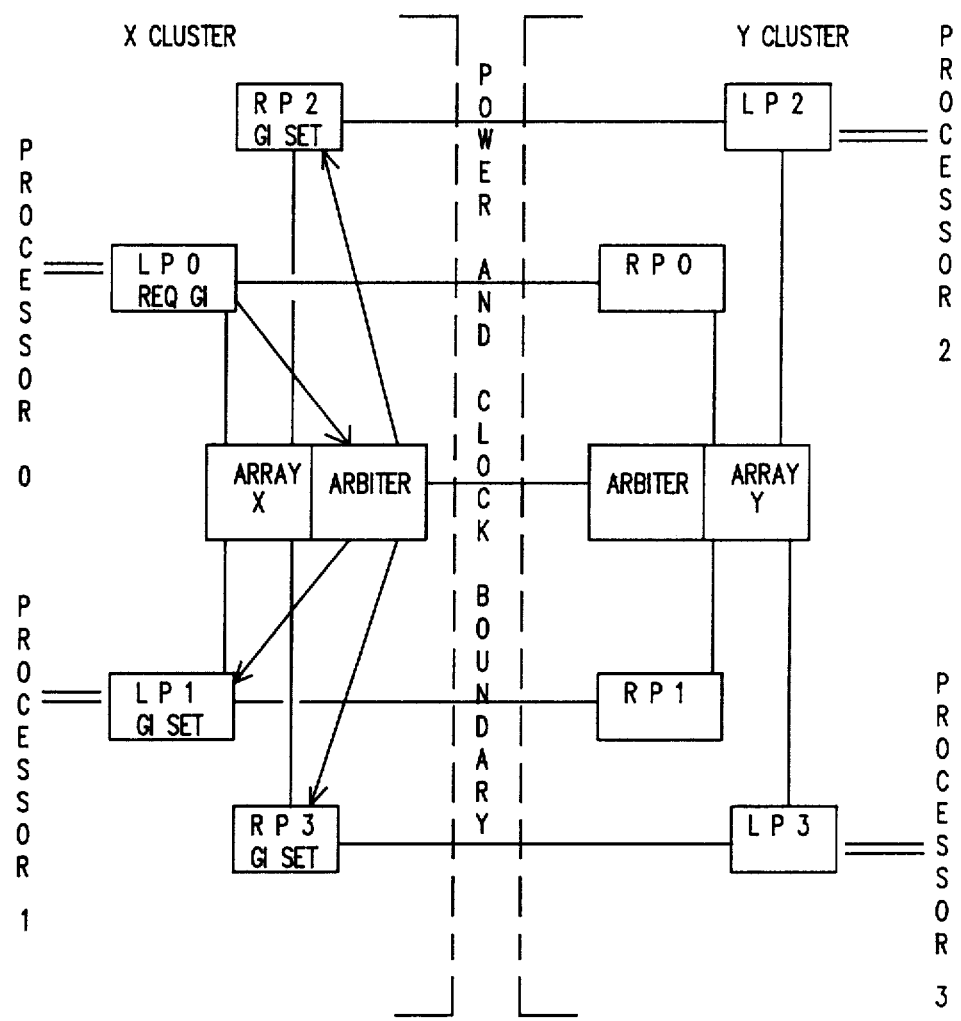
FIG. 7a, 7b and 7c show three examples of the global interrupt facility (GIF).

The following examples show the signal paths of the global interrupt facility:

Example 1. Referring to FIG. 7a, there is shown one operation of the GIF. Processor P0 initiates a mode change. It sets the reconfiguration data in the control block of array X and activates global interrupts in local mode. Processor P1 would receive a global interrupt in his local port. Processors P2 and P3 would receive a global interrupt in their remote ports.

Figure 7B:
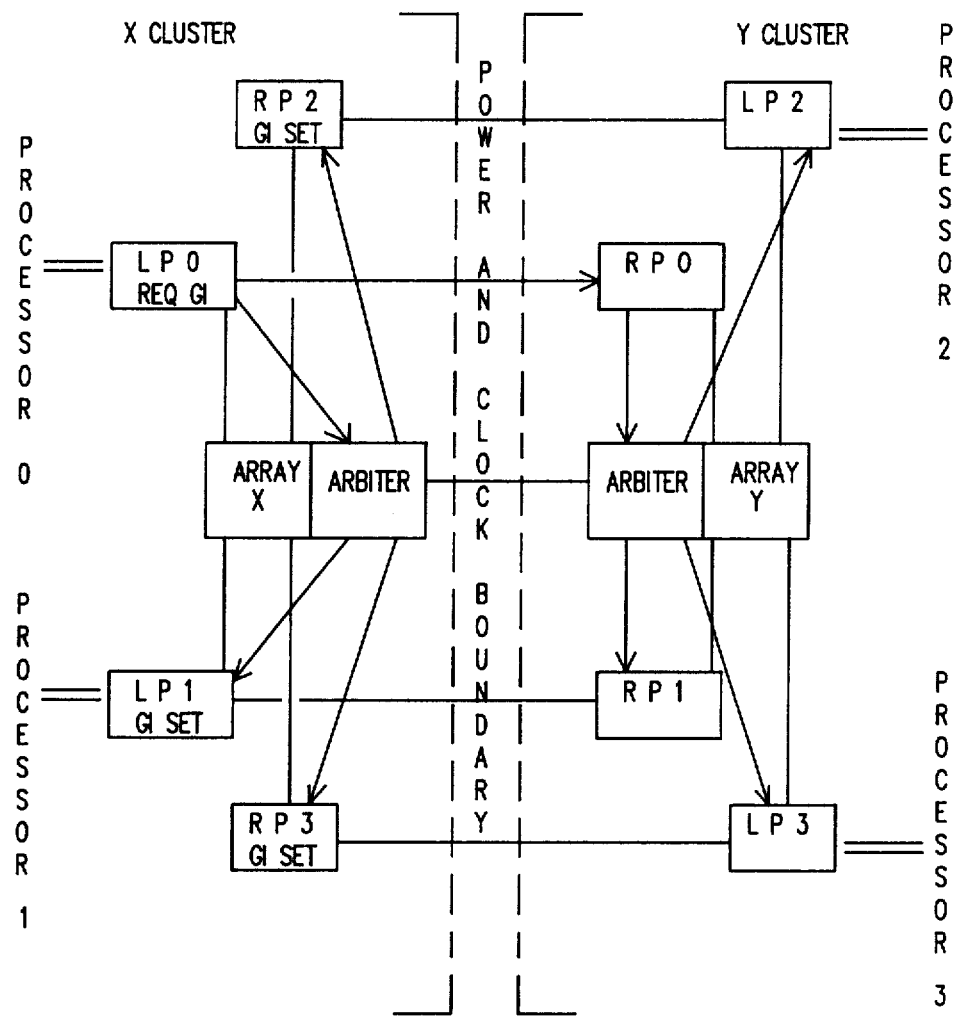

Example 2. FIG. 7b shows another situation involving the operation of the GIF. Processor P0 initiates a mode change. It sets the reconfiguration data in the control block and activates the global interrupt in dual mode. Processor P1 would receive a global interrupt in his local and remote ports. Processors P2 and P3 would receive a global interrupt in their respective local and remote ports.

Figure 7C:
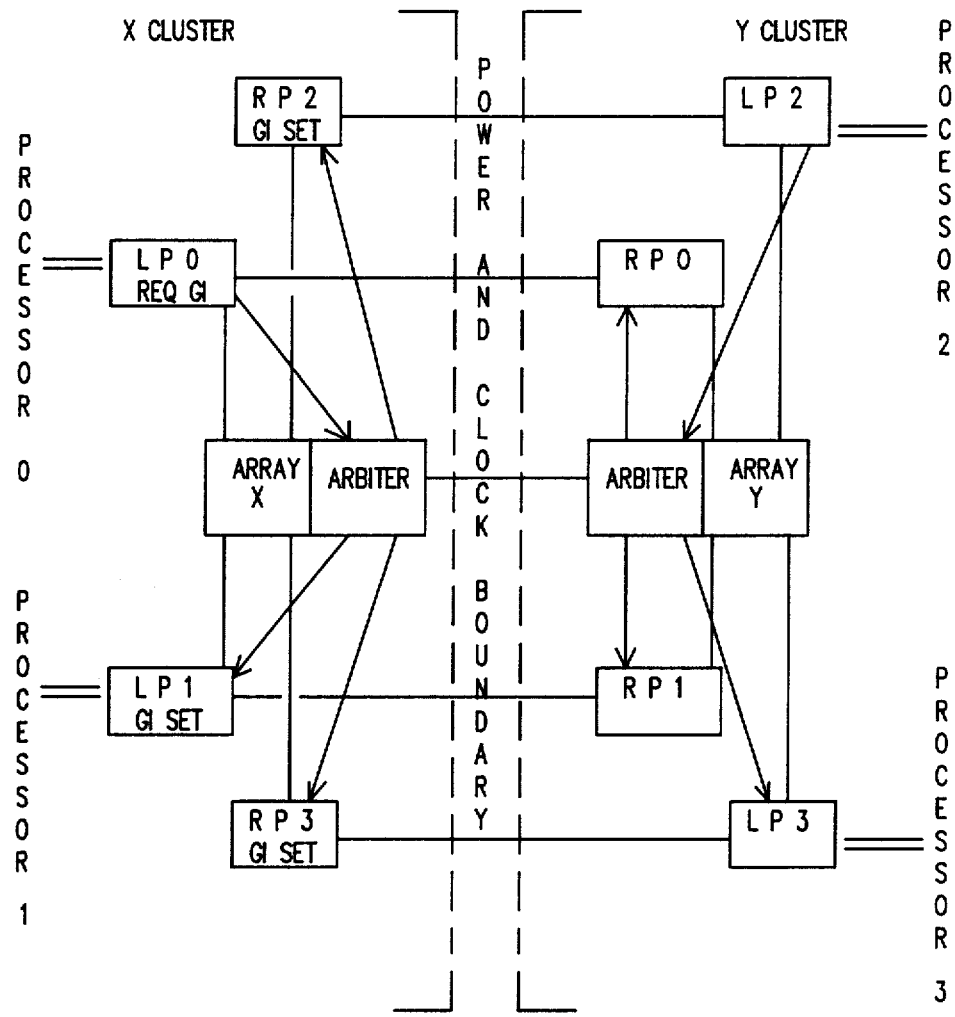

Example 3. FIG. 7c shows a third situation involving the GIF. Both processors P0 and P2 request global interrupt while in local mode. The initialization and error recovery software which handles mode changes would always look at the remote global interrupt latch first, otherwise there is a possibility that the two arrays may become out of synchronization. Processors P0 and P2 both activate global interrupts in local mode almost simultaneously. This is done by performing an UNCONDITIONAL SET operation with the GIF enabled.

There is an overall status register (PSO) in each processor which indicates whether an operation has completed successfully when a global interrupt occurred, and what type of operation occurred last. When the global interrupt bit in PSO is set, it indicates that the global interrupt latch in either the local or remote port was set. This bit is the result of O-Ring the local global interrupt and the gated remote global interrupt. Remote global interrupts are ignored by the local port and not reported in PSO unless a remote mode is enabled. The global interrupt will cause an operation check to occur upon completion of the next array operation.

The local global interrupt indicates that the global interrupt latch was set in the local port. This bit indicates that another processor completed a TEST AND SET or UNCONDITIONAL SET operation with global interrupts enabled in the local cluster.

The remote global interrupt latch indicates that the global interrupt latch was set in the remote port. This bit indicates that another processor completed a TEST AND SET or UNCONDITIONAL SET operation with global interrupts enabled in the remote cluster.

Figure 6A:
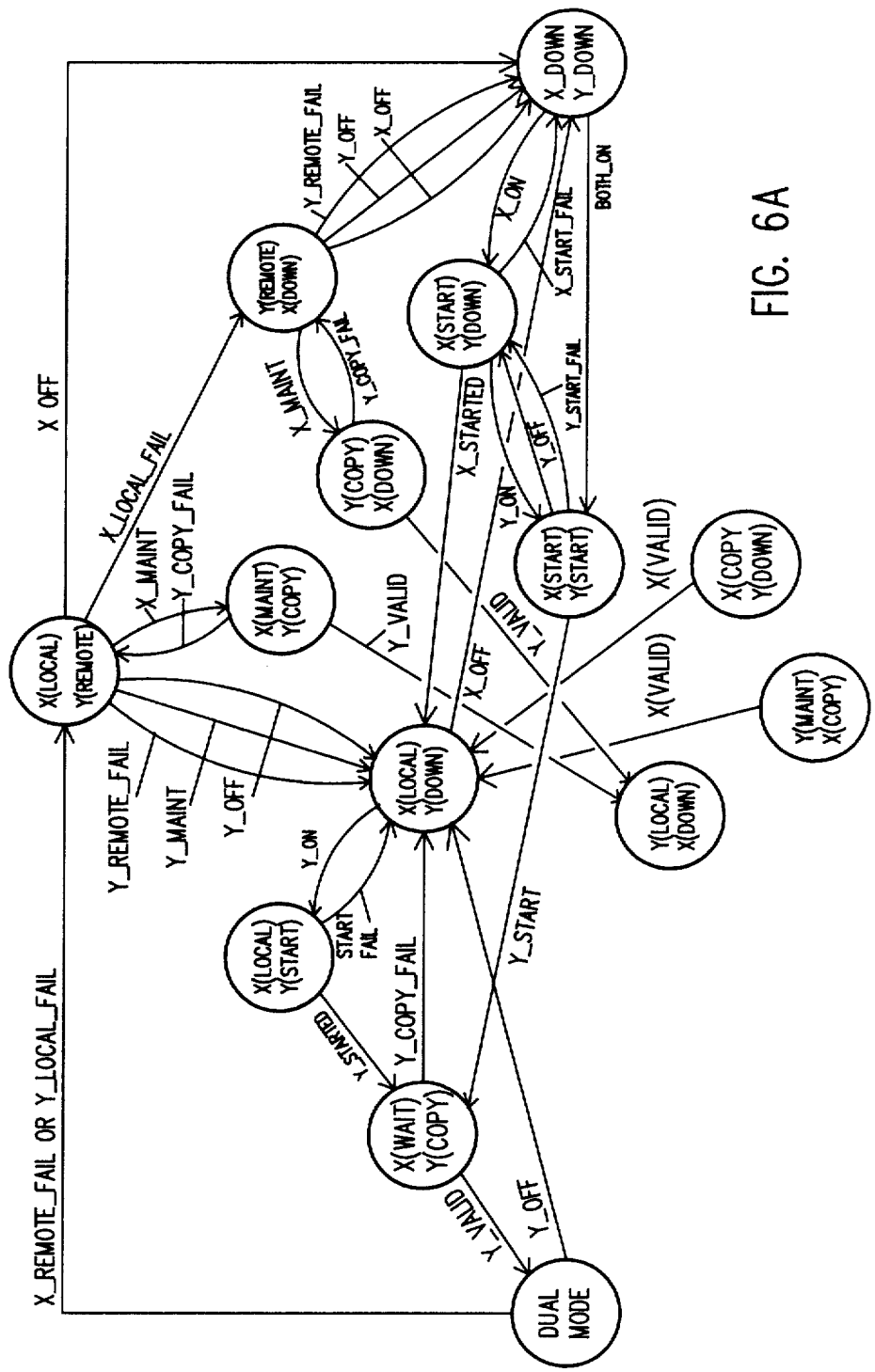
FIG. 6a and 6b show the state machine in the subsystem for performing initialization and error recovery.
Figure 6B:
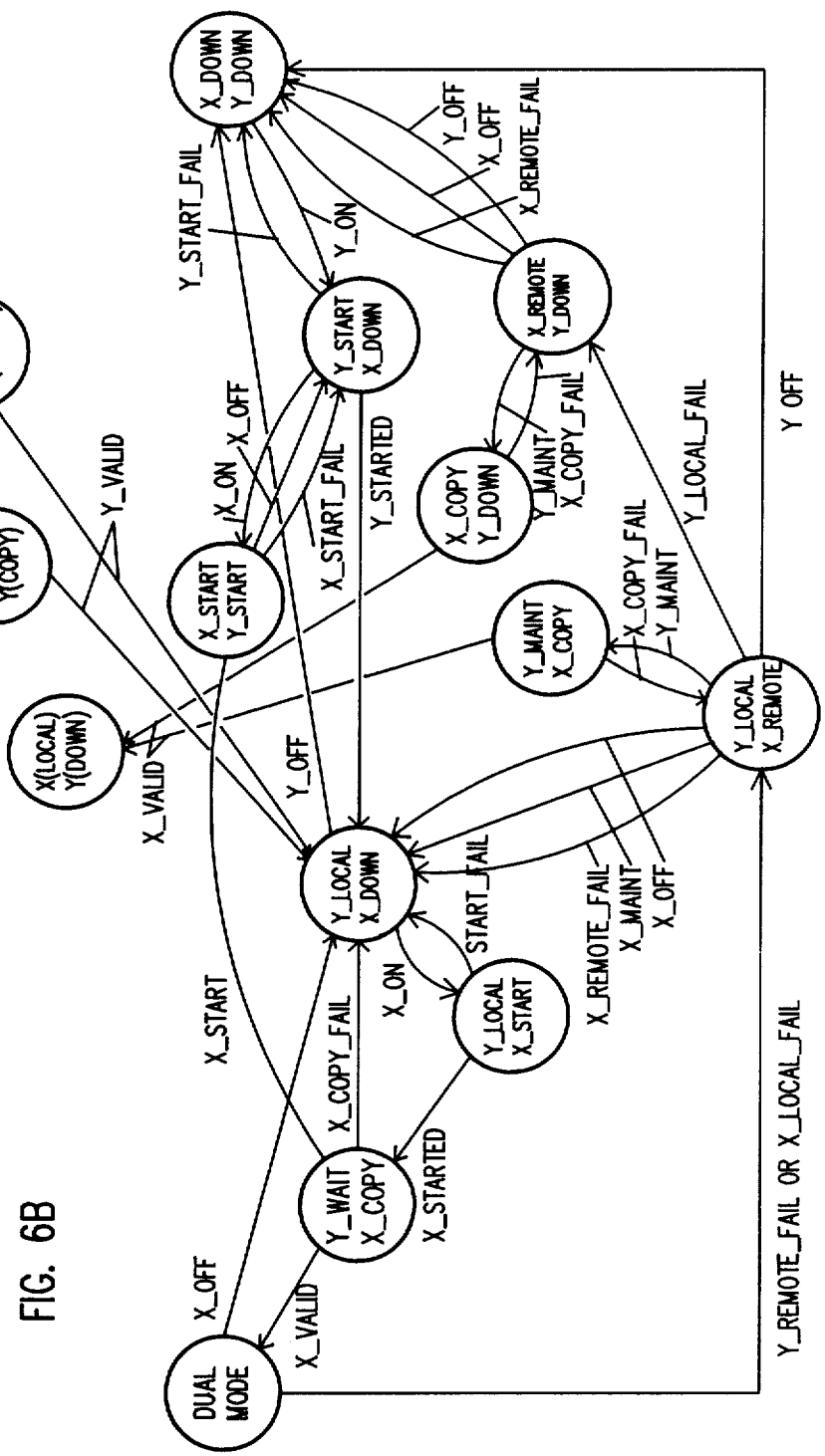

FIGS. 6a and 6b illustrate the possible states which each cluster can operate in and the transitions between the states caused by the indicated conditions.

When a cluster (e.g. cluster X) is powering on or restarting, a processor in each cluster will start the initialization procedure. That processor will first initialize its array. When the initialization is complete, cluster X will lower a signal (called a fenced bit) and check the state of the fenced bit of the other cluster, Y. If the fenced bit in cluster Y is still set, cluster X will consider the initialization procedure complete and allow the cluster to come on line.

When a processor in cluster X sees that the fenced bit of cluster Y is inactive, it assumes that cluster Y has been on line and that its array represents the current state of the sub-system. Therefore, the array in cluster X must be brought up to date. This is accomplished by a processor in cluster X issuing an order to the operational cluster, Y, telling it to enter a wait state. Cluster X will then wait until all operational processors in cluster Y have seen the order and entered the wait state. At this point that processor in cluster X will copy cluster Y's array to synchronize both arrays. When both arrays are synchronized, the processor in cluster X will order the processors in cluster Y to leave the wait state, enter dual mode and start normal operation. Cluster X will also enter dual mode, then go on line to the attached channel. The operating cluster (i.e. cluster Y) performs the state transitions without disturbing current channel operations and without having to check that cluster X requires service.

When a processor in the operating cluster (i.e. cluster Y) attempts to access the array while an order is pending, it will be interrupted via the GIF and control will pass to an array interrupt service procedure. Once the array interrupt service procedure has completed its task, control will be returned at the point of interruption of the functional code and the operation will resume.

When a processor (e.g. processor P0) is accessing the array and an error occurs, the array hardware will cause an interruption, thereby passing control to the array error procedure. The array access operation is retried by the recovery process and, if successful, control is returned at the point of interruption. When retry is unsuccessful, the recovery procedure determines which one of the arrays is at fault and invokes the array switching procedure. The switching procedure then retries the operation using only the operational array. When the operation is successful, an order is then issued to the other processors to cease dual operation and resume operation on the operational array. Processor P0 need not wait for the other processors to answer their order, as the array hardware will not allow them to access any storage element until they have serviced the processor's order. When neither array can be used by the failing cluster, it will be taken off line and no orders will be issued. This dynamic reconfiguration of a processor's access to the arrays increases availability of the array data.

Once a permanent failure has occurred in the array complex and access has been reconfigured, it will then be necessary to perform a repair action. In several states, however, the cluster that requires repair contains the active storage element. The maintenance events, as illustrated in FIGS. 6a and 6b, move the data to the other storage element, so that repair can take place.

While we have illustrated and described the preferred embodiment of our invention, it is to be understood by those skilled in this art that various changes in form and details may be made in this invention without departing from the spirit and scope of the invention.

TABLE 1a

| X CLUSTER | | | > < | Y CLUSTER |
|---|---|---|---|---|
| Invtl Event | Mode | Execution order | > < > < | Execution order |
| 1 P1 read, P3 write | DUAL | P1 - read | > < | P3 - write |
| 2 | | P3 - write | > < | P1 - read |
| 3 | | | > < | |
| 1 P0 T&S, P1 T&S | LOCAL | P0 - test | > < | |
| 2 | | | > < | |
| 3 | | P0 - set | > < | |
| 4 | | P1 - test | > < | |
| 5 | | | > < | |
| 6 | | P1 - set | > < | |
| 7 | | | > < | |
| 8 | | | > < | |
| 1 P0 T&S, P2 T&S, P3 Read | DUAL | P3 - read | > < | P0 - test |
| 2 | | P0 - test | > < | P3 - read |
| 3 | | | > < | P0 - set |
| 4 | | P0 - set | > < | |
| 5 | | P2 - test | > < | |
| 6 | | | > < | P2 - test |
| 7 | | P2 - set | > < | |
| 8 | | | > < | P2 - test |

TABLE 2

| Intvl | Event | X CLUSTER Mode | Execution order | | | Y CLUSTER Execution order |
|---|---|---|---|---|---|---|
| 1 | P0 T&S, P2 T&S | DUAL | | > | < | |
| 2 | | | | > | < | P0 - test |
| 3 | | | P0 - test | > | < | |
| 4 | | | ARBITRATION ERROR | | | |
| 5 | P0 commence error recovery | | | > | < | |
| 6 | | | | > | < | |
| 7 | P0 Arbiter reset | | P0 -arb reset | > | < | |
| 8 | P2 commence error recovery | | | > | < | P0 - arb reset |
| 9 | P0 retry T&S | | | > | < | |
| 10 | P2 arbiter reset | | P2 -arb reset | > | < | P0 - test |
| 11 | | | P0 - test | > | < | P2 - arb reset |
| 12 | P2 retry T&S | | | > | < | P0 - set |
| 13 | | | P0 - set | > | < | |
| 14 | | | | > | < | P2 - test |
| 15 | | | | > | < | |
| 16 | | | | > | < | |
| 17 | | | P2 - set | > | < | P2 - set |

TABLE 3

| | |
|---|---|
| GR0, GR1, GR2, GR3 | Global Request Path 0, 1, 2, 3 |
| GG0, GG1, GG2, GG3 | Global Grant Path 0, 1, 2, 3 |
| ERR0, ERR1, ERR2, ERR3 | Error Detected Path 0, 1, 2, 3 |
| L0, L1 | Dual Lock Command Request from Even, Odd Local Port |
| R2, R3 | Dual Lock Command Request from Even, Odd Remote Port |
| CL0, CL1 | Set portion of dual lock command complete Even, Odd Local Port |
| X | X cluster indicator, settable by microcode, this bit gives priority to the X cluster in case of ties. |
| GHS | Grant Home State |
| RHS | Request Home State |

We claim:

1. A multiprocessor system of the kind in which each processor accesses common system information asynchronously, the information being updateable by more than one processor simultaneously and dynamically, the system comprising:
   two processor clusters each comprising at least two processors, each cluster operating on a separate clock and power boundary,
   an array in each cluster having definable, lockable regions therein for storing said system information,
   a plurality of local ports and a plurality of remote ports in each cluster coupled to the array for enabling execution of array operations in that cluster;
   each processor in each cluster being connected to a respective local port, each local port having at least one register for storing address, data, control and status information and each local port being coupled to a corresponding one of said remote ports in the other cluster for communication therewith;
   each remote port having at least one register, each such register being connected to a corresponding register in the respective coupled local port of the other cluster, said at least one register storing said address, data, control and status information for causing array operations to be executed selectively in either cluster or in both of said clusters concurrently; and
   an arbiter in each cluster connected to the local ports and remote ports therein, each arbiter being coupled to its corresponding array for controlling access thereto and operation thereof, each arbiter communicating with the arbiter of the other cluster for arbitrating global operations, including dual mode TEST AND SET and UNCONDITIONAL SET operations, to its own array and the other (remote) array, and each arbiter comprising means for executing read/write operations in unused array cycles between the TEST portion and the SET portion of a TEST AND SET operation.

2. The system as in claim 1, wherein each processor, via its associated local port and/or its corresponding remote port in the other cluster, issues an arbiter reset command to at least one of the arbiters for recover after an arbiter error, and wherein each arbiter further comprises means for inhibiting a processor from executing an arbiter reset command during recovery from an arbiter error when such a command has already been executed by another processor.

3. In a multiprocessor system wherein operation of the processors requires asynchronous access to common system information, the common system information being dynamically updateable by more than one processor concurrently, a method for improving the availability of the multiprocessor system and for communicating information between processors, comprising the steps of:
   dividing the processors into two clusters;
   providing an array in each cluster to store a copy of said system information, said array having a plurality of definable, lockable regions;
   operating each cluster on a separate power and clock boundary;
   connecting each processor in a particular cluster via a respective local port to the array and to an arbiter for that particular cluster and also to a corresponding remote port in the other cluster;
   connecting each remote port in said other cluster to the array and to an arbiter for said other cluster;
   at each update of said system information by a processor in its own cluster via its associated local port, also updating concurrently the copy of system information in the other cluster via the corresponding remote port therein if the array in the other cluster is accessible;
   arbitrating array operations via said arbiters in both arrays among all requesting processors; and
   while performing a TEST AND SET operation for one processor in one of the clusters, performing read/write operations for another processor in either of said clusters during unused array cycles between the TEST portion and the SET portion of the TEST AND SET operation.

4. A method as in claim 3, further comprising the step by each processor of performing an array read, write, TEST AND SET or UNCONDITIONAL SET operation in one of the following operating modes: (1) local array only, (2) remote array only, or (3) both arrays, and wherein each processor can perform one of said types of array operation in one of said operation modes and another array operation in another of said operation modes.

5. A method as in claim 4, further comprising the step by each processor of directing other processors to operate under one of said operating modes.

6. A method as in claim 3, further comprising the step by one of said processors of performing recovery after an arbiter error, and the step by an arbiter of inhibiting more than one processor from executing an arbiter reset command during recovery from the same error.

7. A method as in claim 6, further comprising the step by each processor of checking whether the other cluster is operational, and restoring its own array using information from the other array if the remote cluster is operational.

8. A method as in claim 3, comprising the steps of:
initiating a mode change in response to one of the processors executing a TEST AND SET operation to effect a lock on a region in an at least one of the arrays; and
notifying each of the other processors of said mode change at the time it next accesses an array on which said lock was effected.

9. A method as in claim 3, comprising the steps of:
responsive to initiation of a mode change by a particular processor in one of the clusters, setting reconfiguration data in the local array of said one cluster and activating global interrupts in a local mode in said one cluster; and
transmitting the global interrupts from said particular processor to other processors in said one cluster via their local ports and to processors in the other cluster via their associated remote ports in said one cluster.

10. A method as in claim 3, comprising the following steps for reconfiguring the system for maximum availability without performance degradation following a failure in one of the arrays or arbiters or remote ports or under certain circumstances in a local port:
initiating a mode change in response to one of the processors executing a TEST AND SET operation on a lock byte in a mode change control block to effect a lock on a region in at least one of the arrays;
writing reconfiguration data in the control block; and
responsive to said one processor releasing the lock by an UNCONDITIONAL SET operation, setting global interrupt latches in the local and remote ports of the other processors in at least one of said clusters to indicate a mode change is pending.

* * * * *